(12) United States Patent
Alexander et al.

(10) Patent No.: US 6,189,111 B1
(45) Date of Patent: Feb. 13, 2001

(54) RESOURCE HARVESTING IN SCALABLE, FAULT TOLERANT, SINGLE SYSTEM IMAGE CLUSTERS

(75) Inventors: James R. Alexander; Rory Foster, both of Austin; Robert R. Teisberg, Leander, all of TX (US)

(73) Assignee: Tandem Computers Incorporated, Cupertino, CA (US)

( * ) Notice: Under 35 U.S.C. 154(b), the term of this patent shall be extended for 0 days.

(21) Appl. No.: 09/048,937

(22) Filed: Mar. 26, 1998

Related U.S. Application Data

(60) Provisional application No. 60/042,133, filed on Mar. 28, 1997.

(51) Int. Cl.[7] ................................................ H02H 3/05
(52) U.S. Cl. ................................... 714/8; 714/7; 714/13
(58) Field of Search .............................. 714/7–9, 11, 13

(56) References Cited

U.S. PATENT DOCUMENTS

| | | | |
|---|---|---|---|
| 5,919,266 | * | 7/1999 | Sud et al. ............................ 714/13 |
| 5,928,367 | * | 7/1999 | Nelson et al. ........................ 714/6 |
| 5,978,932 | * | 11/1999 | Nishiyuki et al. . | |

* cited by examiner

*Primary Examiner*—Norman M. Wright
(74) *Attorney, Agent, or Firm*—Townsend and Townsend and Crew LLP

(57) ABSTRACT

A method is presented that enhances the survivability of system software components, even in the event of catastrophic failure of the computing element on which they reside. In particular, the combination of a distributed operating system (Non Stop Clusters) and a fault-tolerant interconnect (ServerNet) provides an environment conducive to posthumous recovery strategies that have been unavailable in previous distributed computing environments. The specific strategy outlined here is called resource harvesting, and involves a novel approach that retrieve critical data structures of memory from a failed computing element for reconstruction on a non-failed computing element, allowing such critical data structures to continue with their original function.

9 Claims, 3 Drawing Sheets

RESOURCE HARVESTING IN SCALABLE, FAULT TOLERANT, SINGLE SYSTEM IMAGE CLUSTERS

This application claims the benefit of Provisional Application 60/042,133 filed Mar. 28, 1997.

BACKGROUND OF THE INVENTION

The present invention relates generally to computing systems, and more particularly to a multiple processing system that incorporates a number of processing and input/output units interconnected in clustered environment and employing a distributed operating system in a manner that provides posthumous recovery strategies for failed units of the system.

Distributed computing systems, which for some time have held out the hope of more highly available computing environments, are now realizing that hope. By distributing computing resources among a group of processor environments, a system can continue to make available those computing resources, even in the face of a failure of one of the computing environments, by calling into operation a copy of a computing resource that may be lost with that failure. However, in such systems the addition of processing components can produce less availability if the underlying components are not engineered for fault detection, isolation, and recovery. Traditionally, such distributed or clustered environments are visible in application space. But, application programs and processes must be developed with the awareness that they are executing inside a cluster of independent computing elements, or "nodes," in order to scale performance.

A recent extension to clustered environments is the application of transparent network computing ("TNC") which operates to enable a collection of independent computing environments, both uniprocessor and multiprocessor and any associated processing elements and processes, to be organized in a single system image ("SSI"). TNC (an SSI clustering environment) has historical ties to the Transparent Computing Facility (TCF) in the IBM AIX operating system for PS/2 and IBM 370 systems. (A more complete discussion of TCF can be found in "Distributed UNIX Transparency: Goals, Benefits, and the TCF Example," by Walker, and J. Popek; *Proceedings of the Winter 1989 Uniforum Conference.*) TCF has been replaced by TNC, and early versions of TNC appeared in the OSF/1 AD kernel for the Intel Paragon. The latest versions of TNC have been ported to UNIX SVR4.2 ES/MP and Unixware 2.1 versions of the UNIX software and are incorporated in a loosely-coupled UNIX software package called "Non Stop Clusters for SCO Unixware" ("NSC"), a single system image clustering technology from Tandem Computers Incorporated, Cupertino, Calif. The TNC technology, as available, has been enhanced to remove risk associated with single points of failure within the distributed operating system. This effort as contained in the NSC software, represents a collection of software subsystems that provide scalability, availability, and manageability for a single system image cluster.

TNC technology enables a collection of processors to operate so that all machine resources are presented as a single system. The boundaries between platforms, interconnections, and the complexity of programming and managing a collection of independent processors is eliminated. Applications are unaware that they are executing any differently than they would in any uniprocessor or symmetrical multiprocessing (SMP) environment. They are able, nevertheless, to benefit from distributed resources as though they existed in a single system.

The single system image provided by TNC enables efficient process migration, since all resources appear the same regardless of the node on which a process happens to be executing. The single system image and process migration are critical to features such as manageability and scalability. System management is simplified during software upgrades, because processes can be migrated around the cluster rather than be terminated and restarted. As each node migrates all of its processes and operating system resources, it can then be safely upgraded. Later processes can be migrated back to the original node or redistributed by another NSC feature, automatic load balancing. As processes are balanced over the SSI cluster, system throughput increases. The increase in performance from load balancing is not limited to the migration of processes. Other operating system resources, such as shared memory or devices, are migrated in order to scale performance as more nodes are introduced to the cluster. Since the balancing is performed by the operating system, the increased performance is transparent to the applications. That is to say, no special clustering code is required to improve performance within the single system image cluster.

Process migration, however, has its limits. Typically, it is only the address space and execution threads of a process that are moved from one node to another. Other resources related to the migrated process (e.g., open files, inter-process communication facilities, shared memory descriptors) stay behind. Thus, should a node fail, the resources of that node may be lost, and any processes that have been migrated from that node will be hampered or similarly lost.

In the past, a computing element (i.e., processor unit) of a distributed or clustered system experiencing a catastrophic system failure, or system panics, is lost to the system. Such failures have resulted in valuable information stored in computer memory being irreclaimable to the remainder of the system. The loss of such information has impeded continuous computing availability. Examination of the memory of the failed unit is limited to using interactive debugging tools at best. No attempt is made to recover the valuable information stored in the memory of the failed unit.

Thus, it can be seen that there exists a need to automatically recover computer memory that was previously considered lost. Preferably, such a method should incur no run-time overhead associated with traditional checkpointing techniques.

SUMMARY OF THE INVENTION

The present invention is directed to providing a clustered processing environment with the capability of "harvesting" the information resources from the memory of a failed computing element, thereby recovering what was once considered lost.

Preferably, the invention is employed within a clustered structure that provides a single system image environment—such as one employing TNC technology, although the invention is also applicable to other technologies. According to the present invention, retrieving the information resources of a computing element ("node") experiencing failure, herein called "resource harvesting," involves gathering the available memory objects of the failed node, checking their usability (i.e., determining the validity, security, and authenticity of the memory object), and forwarding them to a non-failed node. Then, the memory objects can then be reconstructed at the non-failed node, and function continued as though no failure had occurred. Memory objects are data structures that represent the state of critical information resources. These include system resources such as shared memory, semaphores, message queues, processes, memory mappings, cluster file tokens, devices, and similar data structures.

Harvesting, as conducted by the present invention, is automatic and transparent to the application, so it appears that computing services are uninterrupted. The operating system handles the details of processing a system failure, when detected, as well as reconstructing the memory objects. The invention provides two types of harvesting, namely active and passive. Active harvest involves the failed node performing the harvesting operations (i.e., gathering, checking, and forwarding memory objects to another node in the cluster). Passive harvest employs a non-failed node which accesses the memory of the failed node, performing a series of read operations to recover the resources (or those that are recoverable) of the failed node.

In one embodiment of the invention, a cluster of processing unit nodes employs the "I'm Alive" technique taught by U.S. Pat. No. 4,817,091 (hereinafter the "'091 Patent") so that each of the nodes will broadcast to each of the other nodes of the cluster a message that indicates the well-being of the broadcasting node. A cluster membership service (CLMS) is utilized to, among other things (such as providing the collective knowledge of what nodes form the cluster, and their identities), detect a node failure by noting the lack of a broadcast from the node. The CLMS will then notify one of the other nodes that it is designated as a recipient of the harvest of the failed node. The designated node will then start a timer. If the designated node is not contacted by the failed node (for active harvesting) within a predetermined amount of time, the designated node will assume that the failed node is unable to perform a harvest of its resources, and attempt to perform a passive harvest.

In a further embodiment, N+1 redundancy is used for the cluster architecture where the cluster includes N+1 nodes, but only N of the nodes are used for system functions. The extra node is used only for harvest operations—either as the recipient of an active harvest, or as the node that initiates a passive harvest.

A principle advantage of the present invention is its capability of providing a continuous availability of computing services without the need for run-time overhead associated with typical checkpointing solutions. Another advantage over checkpointing includes the timeliness of information. Checkpointing will normally not restart with the most recent information, but rather with the most recent checkpointed data which most likely is relatively stale. Harvesting, according to the present invention, uses an interconnect facility that includes collecting data held in cache memory to ensure that the most recent memory information is recovered.

Other aspects and advantages of the present invention will be apparent to those skilled in this art upon a reading of the following detailed description of the invention, which should be taken in conjunction with the accompanying drawings.

DETAILED DESCRIPTION

Before discussing the details of the invention, it is advantageous to first understand the preferred hardware platform for the invention. That platform is generally described in U.S. Pat. No. 5,574,849 (hereinafter the "'849 patent"), the disclosure of which is incorporated herein by reference. The '849 patent discloses and describes a high-speed interconnect fabric, called ServerNet (ServerNet is a registered trademark of Tandem Computers Incorporated). Many of the isolation and recovery strategies of the present invention preferably utilize the protected access and validation which are provided by the system described in the '849 patent through hardware that is configured and controlled by the NSC software. For example, a node$_i$ can declare a block of memory to be accessible by node$_j$, providing a virtual address which node$_j$ uses to read the contents of the memory block. Next, node$_i$ will verify that the request can be granted and routes the data to node$_j$. (Here, i≠j and i, j=1, . . . ,n where n is the number of nodes in the cluster.) The architecture of the '849 patent is such that the processor(s) of the node need not necessarily be involved in the read process. Rather, a form of direct memory access (DMA) architecture is capable of retrieving requested data from memory, and forwarding that data to the requesting node.

The interconnect described in the '849 patent to communicate information between elements of the system is a wormhole-routed, packet-switched, point-to-point network. It is designed with attention paid to reducing latency and assuring reliability. High-speed routers that are simultaneously active and non-redundant rapidly switch data between sources and destinations. The interconnect uses a pair of communication paths for each connection, named the X path and Y path, to provide fault-tolerant communication at rates of about 400 Mbs per path. The architecture disclosed in the '849 patent uses the interconnection facilities to communicate CPUs and I/O devices through a communication fabric composed of multiple routers and can be configured to avoid deadlocks that can be found in multi-stage networks.

Figure 1:
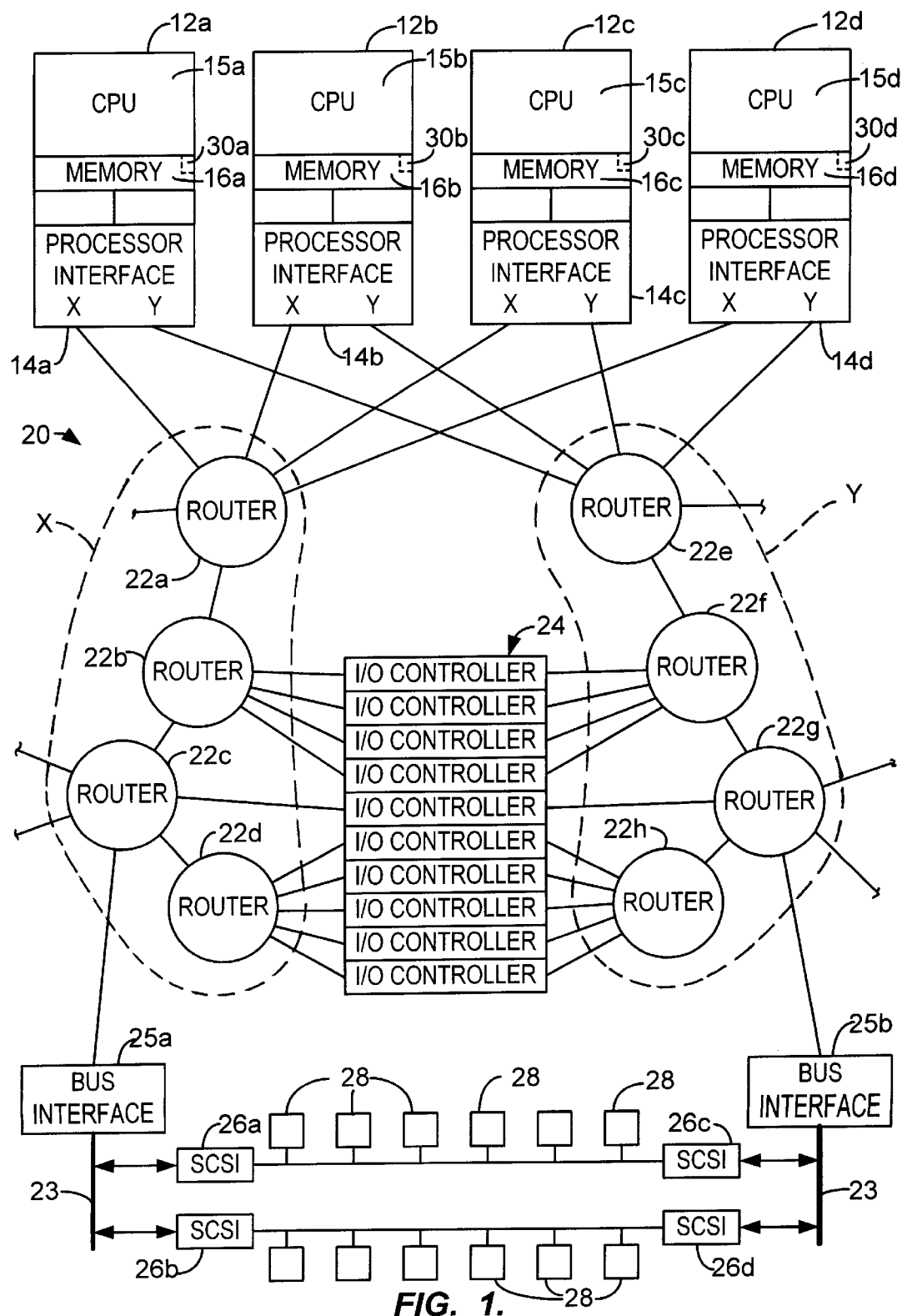
FIG. 1 is a block diagram illustration of a small cluster arrangement of computing elements using a high-speed interconnect and employing the present invention.

Referring to FIG. 1, there is illustrated the basic architecture preferred for employing the invention—described further in the '849 patent. As FIG. 1 shows, a clustered system is shown as including processor nodes 12a, 12b, 12c, and 12d. More processor nodes can be used, but for simplicity, and to keep from unduly complicating the understanding of the present invention, only four processor nodes 12 are shown. Also, although the nodes are shown as uniprocessor (CPU) nodes, multiprocessor nodes, such as a symmetric multiprocessor (SMP) architecture, may also be used.

Continuing with FIG. 1, each of the processor nodes 12 includes processor interface 14 (14a, . . . , 14d) that connects to an interconnect fabric 20 composed of a number of six-port routers 22 (22a, 22b, . . . , 22h). Certain of the routers 22 connect to a number of dual-ported input/output (I/O) controllers 24, while other of the routers provide communication paths to bus interfaces 25 which, in turn, connect to small computer system interfaces (SCSI) 26 via SCSI buses 23, providing access to the storage subsystems 28. Message packets are transmitted from a CPU or I/O device to any another CPU or I/O device by mapping virtual addresses through the system address space.

Each of the nodes 12 includes, in addition to the processor interface 14, a central processing unit (CPU) 15 and memory 16. (In the architecture of the '849 patent, the CPU 15 comprises a pair of microprocessors operating in lock-step synchronism to execute the same instructions of a substantially identical instruction stream at substantially the same moment in time.) The CPU 15 does not have direct access to the memory 16 or of the interconnect fabric 20. Rather, the CPU 15 operates to send or receive data to or from memory or I/O (e.g., storage devices 28) through the processor interface 14. In addition, the processor interface provides a direct memory access facility that allows processing elements external to the node (e.g., bus interface 25, I/O controller 24, or another of the nodes 12) to access the memory 16 to read data therefrom, or write data thereto. Accordingly, each node 12 is able to independently access memory of the other processor nodes 12 of the cluster provided by the TNC environment. So, unlike non-uniform memory access (NUMA) architectures, the memory space is not implicitly visible; but also, unlike strict message-based systems, it is not completely opaque.

The architecture shown in FIG. 1 eliminates the impact of single points of failure through the interconnect fabric 20. FIG. 1 shows merely one of many possible interconnections. Note that the interconnect forms two separate paths, X and Y, between any processor node 12 and any other element of the cluster. Thus, for each X path, an identical Y path exists for every connection. Upon transmission failure within any segment of the X path, an alternate Y path is selected and transmission continues.

Resident on the cluster, and running in distributed fashion on the nodes 12, is a cluster membership service (CLMS) that includes Cluster Manager components that run on all nodes. (There is a Master Cluster Manager running on a designated node that coordinates the Cluster Manager components.) The Cluster Manager component on each node 12, called "Regroup," periodically prepares and sends to each of the other nodes 12 an "I'm Alive" message according to the technique taught in '091. The Cluster Manager component of each node is responsible for receiving the periodic "I'm Alive" message from the other nodes, and for determining if a node 12 fails to send its required "I'm Alive" message. If a failure is noted, the Cluster Manager component will report that failure to the Master Cluster Manager component of the nodes which, in turn, will notify the other nodes. One of the other nodes will be designated as the recipient for the harvest of a failed node, and will ready itself for that task in a manner described more fully below.

The cluster illustrated in FIG. 1 is configured in a manner that allows faults and/or errors occurring in the processor nodes 12 to be detected and made known to the other processor nodes 12. For example, as more particularly described in the '849 patent, the cluster may include a maintenance diagnostic system that is communicatively coupled to all elements of the cluster (e.g., the processor nodes 12, routers 16, I/O controllers 20, etc.) for monitoring operation of the cluster's elements. Faults and errors can thereby be discovered by the maintenance diagnostic system, and the fact of error relayed to the other processor nodes 12. Conversely, or in addition thereto, the processor nodes 12 may employ the "I'm Alive" concept described above.

It is the ability of each processor node 12 to independently access the memory of the other processor nodes 12 nodes that sets the stage for the recovery strategies of the present invention.

Recovery is conducted when the operating system running on one of the nodes 12 of the cluster encounters a fault or error from which it cannot recover, or which casts doubt on the credibility of continued operation; that is, it has been determined, either by the node 12 itself, or by another source (e.g., the maintenance diagnostic system or another node 12) that the node 12 no longer is trustworthy and should be considered to have failed, notwithstanding the fact that the node 12 may still be operational—at least in some sense. Whether passive or active harvesting is used depends in large part on just how operational the failed processor node is determined to be, i.e., is the failed node 12 capable of conducing a harvest of principle resources resident on the node, and sending those resources to a recipient node 12.

Whether active or passive harvesting, one of the (non-failed) nodes 12 is selected in advance to be the recipient of the harvested resources of the failed node. Pre-selection can be by providing an N+1 redundancy (here, N would equal 3), so that the redundant node is the recipient node. Alternatively, the node could be predetermined on a modulo-N basis in which a node j+1 becomes the recipient for the harvest of the (failed) node j. Whichever technique is used, when the Cluster Manager components of the nodes 12 fail to receive an "I'm Alive" message from one of their brethren nodes within a preset period of time of the last "I'm Alive" message from that node, it will be considered to have failed. The node 12 selected as the recipient for the harvest, according to one of the two techniques described above, or whatever other technique may be employed, will set an alarm. If that alarm times out before the recipient node is contacted by the failed node 12, the recipient node will initiate operation to perform a passive harvest, if it can, of the resources of the failed node.

As is well known, most processing unit failures result from software errors or human errors. Often, therefore, a failure of a node 12 will not be caused by a hardware malfunction, although that is a possibility. Software errors are handled by transferring operation from the operating system service in which the error or exception is encountered, to execution of a routine to investigate the error, and to take such action as necessary to attempt to overcome the failure, and should that be unattainable, to harvest what resources can be harvested from the node to allow them to continue running on other of the nodes 12 of the cluster. Since most errors, as indicated, will leave the processing capability of a node 12 experiencing a failure intact, such a harvest is entirely possible, and most times will be an active harvest, i.e., the harvest will be conducted by the node experiencing difficulty.

All nodes 12 maintain, in memory 16, a table 30 (FIG. 1) at a memory address known to all other nodes 12 of the cluster. Maintained in the table is information concerning all harvestable resources of the node, identifying the key areas of memory, by memory address and size, whereat the critical state and other declarative information for the resource resides. It is the information of this table that is used by the harvesting node, whether it be the failed node performing an active harvest, or one of the other (non-failed) nodes 12 to perform a passive harvest. For example, for the operating system such critical state would include process tables, file descriptors, shared memory descriptors, and whatever else would be necessary to restore the services that were resident of the failed node 12. An application may declare portions of its address space to be critical state, and these portions would be recovered in the same way as part of the harvest process to revive the application on another the recipient node 12 of the harvest.

Active Harvesting

Active resource harvesting takes place when the failed node 12 encounters a failure or software exception, as described above, and initiates the resource harvesting operation. Under this circumstance, the failed node 12 is assumed to be sufficiently capable of participating in the harvest operation. The resource eviction is executed in a protected area of memory. (The software that controls active resource harvesting needs to reside in a region of memory that is protected by hardware from software faults elsewhere in the system. Otherwise, there is a risk of having the very fault from which the processor is trying to recover damage the harvesting software, and thereby prevent recovery. The active harvesting software needs to be able to execute correctly regardless of the state of data stored outside its protected memory area. Memory protection helps to guarantee this.) As will be seen, the same basic process used by passive harvesting to ensure that information is usable is also performed for active harvesting. Again, once critical resources continue their function on one or more of the non-failed nodes 12 of the cluster, they have been harvested.

Figure 2:
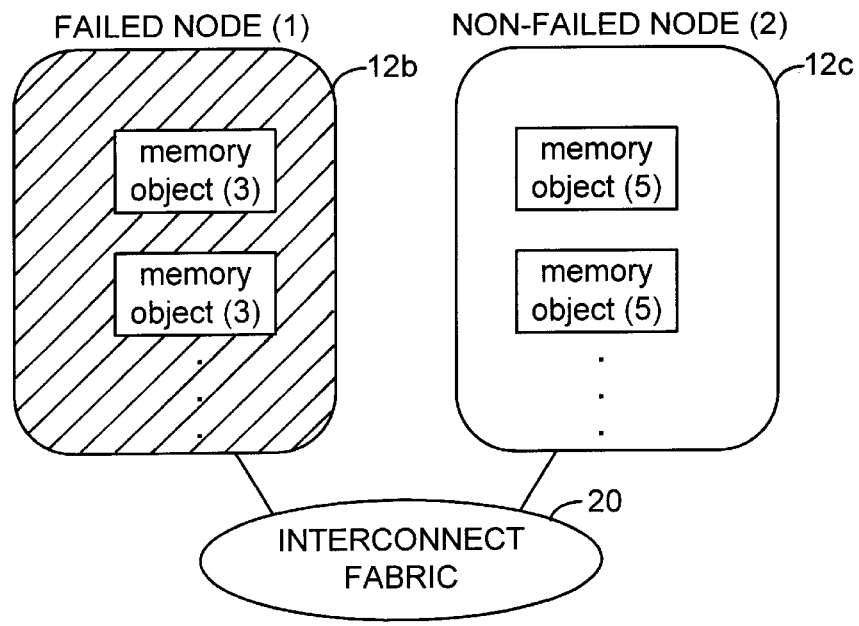
FIG. 2 is a diagrammatic illustration of the harvesting employed by the present invention to transfer memory objects from the memory of a failed node to that of a non-failed node.

To illustrate an active harvest, refer to FIG. 2. Assume that a software exception is encountered by the node 12b, switching operation to execution of software execution as result of the failure or exception. The failed node 12b then examines memory objects (3), and determines the usability of these memory objects. The failed node 12b will then employ the interconnect fabric 20 to transmit the memory objects (3) to a non-failed node 12c. Upon receipt of these memory objects (3), software on the non-failed node 12c allocates corresponding memory objects (5), recreating the contents of each recoverable memory object (3) for the corresponding memory object (5). These memory objects (5) may then continue with their original function.

There are some considerations that must be kept in mind. For example, harvesting may encounter memory objects that are not usable. Such objects will be discarded and treated as memory objects that failed to be harvested. In this scenario, called partial harvesting, isolation becomes salient. In order to make partial harvesting worthwhile, operating system faults must be isolated, so that an entire class of memory objects can be harvested together. An example of such a class would be the interprocess communication (IPC) services such as shared memory, semaphores, and message queues.

Another consideration is the complexity of determining a memory object's usability. Validating resource state is not simply as trivial as testing a checksum with a data structure to ensure sanity of the data structure. There are issues such as ensuring kernel lock consistency, ensuring coherency of distributed virtual memory pages, and others.

Passive Harvesting

Passive resource harvesting occurs when a failure of a processor node is detected by the cluster manager components, and it is determined, or believed, that the failed processor node 12 cannot credibly handle a harvesting operation, i.e., the node 12 identified as the recipient of the harvest (by any of the methods explained below) fails to hear from the failed node within a prescribed period of time. Through the interconnect fabric 20, a non-failed recipient node 12c will first access the table 30b maintained by the failed node 12b at the memory address known to the recipient node 12c (provided, for example, during startup time of node 12c). Remember that the table 30 contains the information necessary to locate the key areas of memory containing the resources desired to be harvested. With the information of the table 30b of the failed node 12b, the recipient node 12c can then access the memory of the failed processor node 12b, at locations identified in the table 30b, to extract key areas (i.e., memory objects) of that memory 16c. The extracted memory objects are then examined by the recipient node 12c in order to determine if information is usable. Once usability is determined, the memory objects are reconstructed on a non-failed node. The resources originally provided by the failed node 12b will continue as though no failure had ever occurred. In the state of continued functionality, such resources are considered harvested.

FIG. 2 can also be used to illustrate the details of the important pieces that interact during a passive harvest. Upon detecting the failure of the failed node 12b, recipient node 12c, using the interconnect fabric 20, will retrieve the memory objects (3), representing the state of information resources, from the failed node 12b. The retrieved memory objects are examined by the recipient node 12c, and for each memory object (3) that the recovery software determines can be safely harvested, the software will allocate a memory object (5) in the recipient node 12c. These memory objects (5) may then continue with their original function.

Figure 3:
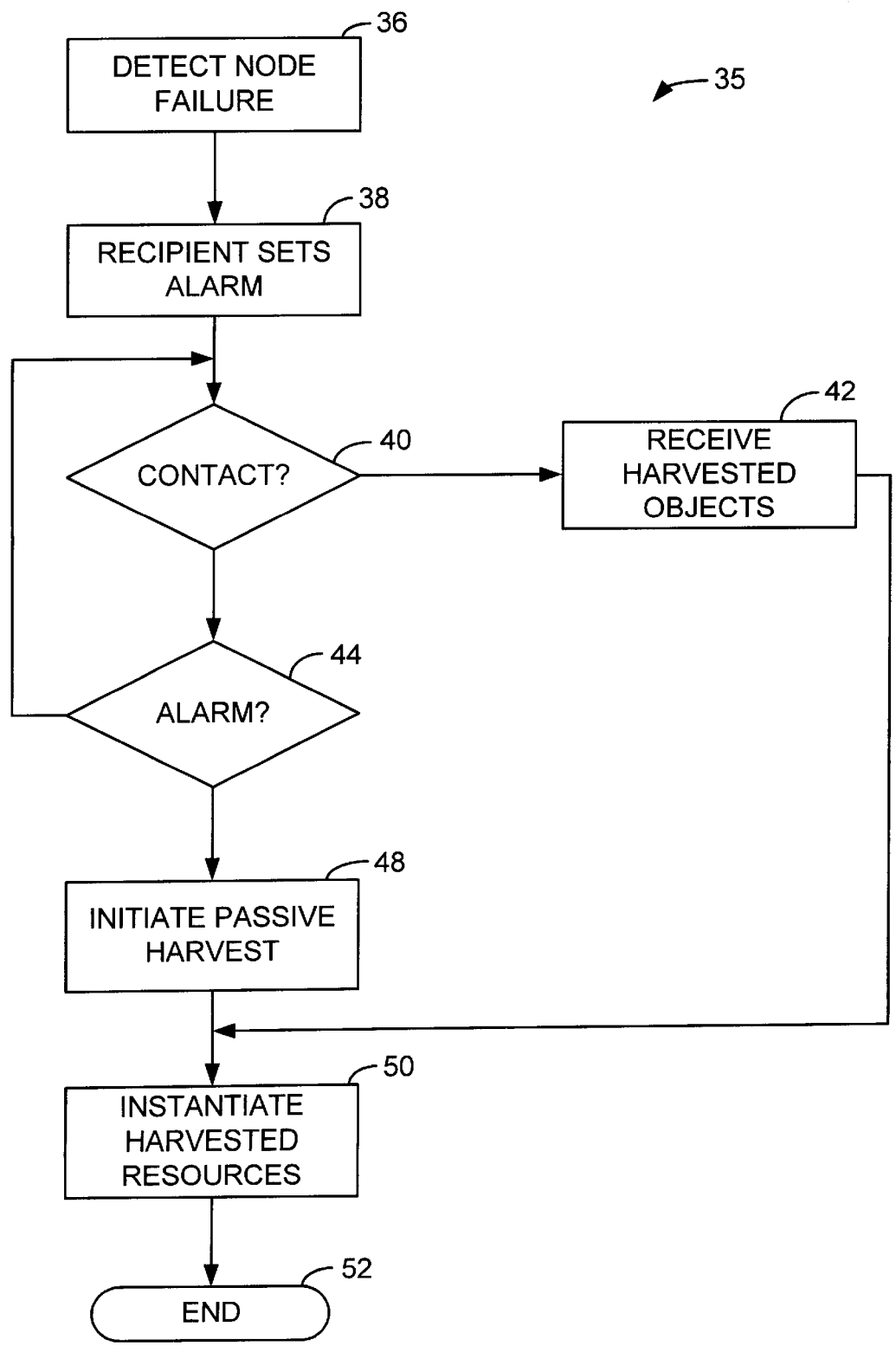
FIG. 3 illustrates generally a procedure taken to initiate a passive harvest operation should the failed node be unable to perform an active harvest.

FIG. 3 illustrates generally the procedure preferred for determining that the failed node cannot perform an active harvest, and for implementing a passive harvest operation. As has been indicated above, each of the nodes 12 include a Cluster Management Component that operates to broadcast periodic "I'm Alive" messages to all other nodes 12 of the cluster, thereby providing an indication of the broadcasting node's well being and operational state. The Cluster Manager Components are also responsible for checking to see that broadcasts are received by the corresponding node 12 from all other nodes of the cluster.

If a node 12 fails, it will cease sending the required I'm Alive broadcast, the absence of which will be noted by the Cluster Manager Components of the other nodes 12. While the non-failed nodes will update their views of the cluster accordingly (e.g., deleting the silent/failed node from the non-failed node's view of the cluster), one of the nodes 12 will be designated as the node for receiving the harvest of resources from the failed node 12. The selection is described more fully below. Here, however, assume that node 12b is the failed node, and the recipient node is node 12c (FIG. 1). Accordingly, when the Cluster Manager Component of the node 12c recognizes that the node 12b is no longer sending I'm Alive, it will initiate on node 12c the passive harvest procedure 35 shown in FIG. 3.

Thus, in step 36 of the procedure 35 the lack of I'm Alive broadcasts signals to the node 12c that the node 12b has failed. The node 12c will set an alarm in step 38, and wait (steps 40, 44) for the node 12b to begin sending to it the results of an active harvest—if node 12b is capable of conducting an active harvest. If it is, the recipient node 12c, at step 42, will begin receiving the harvested objects, and at step 50 the recipient node 12c will incorporate those objects into the system's operational state. (Or, it may move the resources to another node 12 of the cluster where they will be resumed.)

If, however, the recipient node 12c fails to be contacted by the failed node 12b within the time period of the alarm set in step 38, the recipient node will, at step 48, initiate a passive harvest operation. Harvested objects will then be treated in the same manner as would have been active harvested objects, and the procedure ends at step 52.

Object Examination

In order to successfully harvest an object (resource) from a failed node 12, the object must be examined in order to determine if it is salvageable. This examination can use a number of known techniques. For example, if the resource is one implementing various locks, the consistency of the locks can be examined. A key requirement for lock consistency is sufficient redundancy to evaluate correctness. For a reliable harvest, the lock design should use a locking scheme sufficiently sophisticated to record enough information that can be checked. A lock hierarchy contains more redundancy and so is potentially compatible with reliable harvesting.

In addition, data structures often contain partially independent state variables which can exist only in a limited set of combinations. In this case, a valid consistency check would verify that such state variables contain a permissible combination of values.

Also, scattered throughout the kernel are various assertions (coded as invocations of an "ASSERT" macro) which perform ad hoc consistency checks and cause panics if the asserted condition is not true. The same tests can be performed on candidates for harvesting, and harvesting can be aborted if the tests fail.

An application can use all the same techniques as the operating system to validate its own data structures.

Recipient Node Selection

Identifying the recipient node of a harvest can be done in a variety of ways. For example, the cluster may employ an N+1 redundancy design in which one of the nodes 12 (e.g., node 12d) is used only or at least primarily as the recipient node of any harvest of the other nodes 12a, 12b, 12c, should they fail. Alternatively, the recipient node 12 may be identified relative to the failed node. For example, the $12_{j+1}$ becomes the recipient node should the node $12_j$ fail. Where j=N (N being the number of nodes in the cluster), then node $12_0$ forms the recipient of the harvest of node $12_N$, i.e., this provides a modulo(n) solution. Of course, those skilled in this art can see other methods for identifying the recipient node of a harvest.

Harvesting A Shared Memory Object Server

Figure 4:
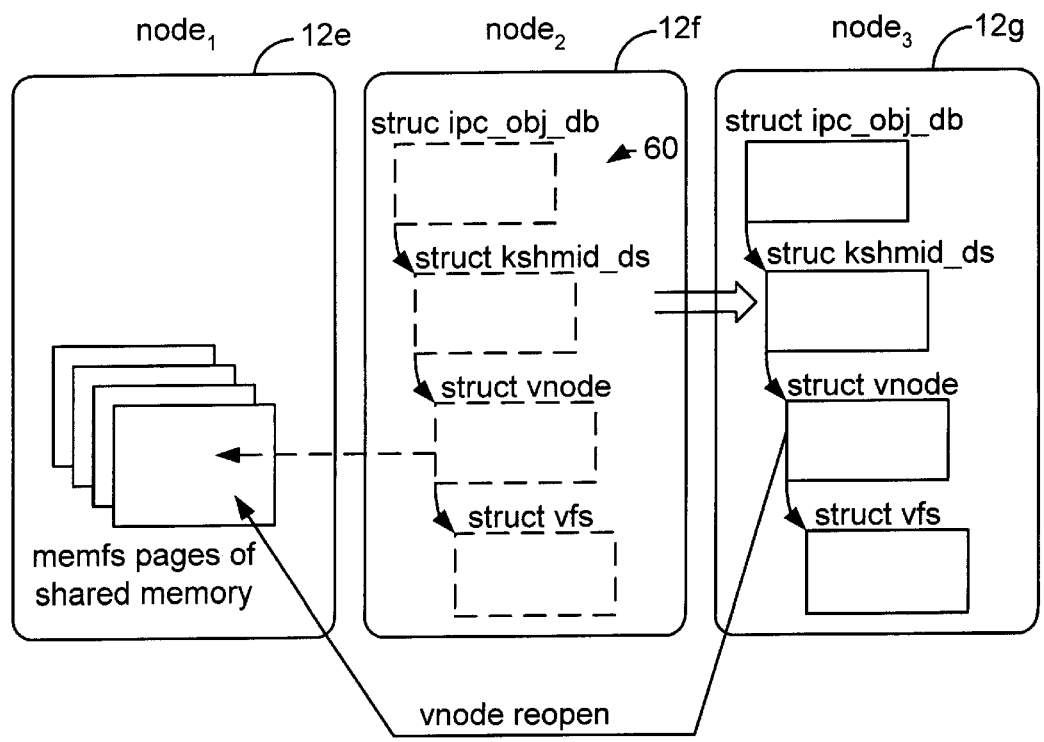
FIG. 4 is a diagrammatic illustration of a three node cluster with a shared memory segment controlled by one of the nodes, and the resource harvesting performed thereon.

The invention preferably utilizes a fixed address range in the cluster address space. This wired (i.e., attached to a specific address) cluster page acts as a virtual address map of memory objects. (Preferably, a compile-time constant is used to fix the location of a pointer to a table describing harvestable objects. The pointer can then be used to find the table, and through the table to find the harvestable objects. The operating system functions that create and destroy harvestable objects are enhanced to add descriptors to the table when the objects are created and remove them when they are no longer needed.) Each non-failed or recipient node is fully aware of how to reconstruct critical system memory objects a priori. Consider the three-node cluster (nodes 12e, 12f, 12g) shown in FIG. 4. In this example, node 12f controls a shared memory segment 60 and node 12g will harvest the shared memory segment object server from node 12f. Here node 12e controls the actual pages of shared memory, because it maintains the TNC Coherent File System (CFS) that backs the shared memory segment 60. (A more complete discussion of the TNC Coherent File System can be found in "TNC Distributed File System Design Specification," B. Walker, D. Zafman, March 1994, attached hereto as Appendix A.) Upon detecting a failure of node 12f, a read operation is initiated by the (non-failed or recipient) node 12g to collect the virtual address map of memory objects located on node 12f. Along with the map of memory objects, information about fault isolation is collected. After determining that harvesting the class of shared memory object servers is appropriate, a series of read operations are performed by a node 12g on the memory of the failed node 12f to collect the data structures that control the shared memory segment. This collection includes: (i) the object database entry for the shared memory object server, (ii) segment size located in the shared memory data structure, (iii) the file system identification in the Cluster File System (CFS) located in the Virtual File System (VFS) layer, and (iv) file system identification data fetched by the vnode layer.

Together this collection of data structures represents the memory object for the shared memory object server on node 12f. Next, the memory object is verified as usable and allocation is performed on nodes to reconstruct the memory object. The shared memory object database entry contains the shared memory key and shared memory identifier. These values are stored in the newly allocated data structures of node 12g. Next the file system identification and its associated data are used to "reopen" the vnode that controls the shared memory segment within the cluster. At this point, the shared memory segment is available.

This class of memory objects is only one type of the many found in the single system image cluster. Each is handled differently and each has a separate set of requirements and considerations.

There is a possibility that it was one of the harvested resources that caused a node 12 to fail, and that the pre-harvest (for active harvesting) or post-harvest (passive harvesting) of the examination found the resource to be good. The harvest could, then, cause the recipient node 12 to fail, resulting in yet another harvest, and a domino effect that could bring down all nodes 12 and, therefore, the entire cluster. An alternate embodiment of the invention will prevent such a rolling failure of cluster nodes by providing a fail-safe that halts the resource harvesting mechanism in the event that a restart of a harvested resource actually causes yet another node failure.

According to the alternate embodiment of the invention, upon failure of a node 12 within a cluster, the failed node will attempt to recover its resources and transfer them to the recipient node (see procedure 35; FIG. 3). If, in spite of all the effort to ensure usability of resources harvested, faulty information is restarted on a non-failed node, causing the non-failed node to itself fail, another harvest attempt is prevented by identifying the fact that a harvest was being attempted when the failure occurred.

Each of the nodes 12 (FIG. 1) will maintain a bitmap (not shown) that operates to identify the nodes of the cluster that are available for harvesting. When a node fails, the Cluster Manager Components of all other nodes (notified as described above) will remove the failed node from the bitmap, as will the recipient node 12. The identity of the recipient node can be added back to the bitmaps of the nodes when it has been determined that the harvested resources have been safely restarted, and the recipient node remains operable.

As additional nodes may be added to the cluster, their identities will be added to the bitmaps maintained by the nodes.

For example, referring to FIG. 1, assume now that node 12d fails, and that node 12a is selected as the recipient. node. Node 12a will check the bitmap it maintains to see that the failed node 12d is harvestable, i.e., its identity has not been removed from the bitmap because of participation of that node in a prior harvest. The Cluster Manager Components of nodes 12b and 12c (as well as that of node 12a) will remove the identities of nodes 12d and 12a from the bitmaps they maintain. Thus, if a resource harvested from the failed node 12d causes node 12a to also fail, the Cluster Manager Components will note that failure. The recipient node 12 will check its associated bitmap and see that node 12a is not among those considered harvestable. Accordingly, no harvest is conducted, and what could have been a rolling failure of nodes through the cluster is prevented.

In the claims:

1. In a computing system including at least a first processor unit and a second processor unit, each having a memory element for storing data and each being communicatively interconnected to each of the other for communicating data, a method of harvesting predetermined portions of the data stored in the memory of the first processor unit, the method including the steps of:

maintaining in the memory element of the first processor unit a table containing information identifying where in the memory element of the first processor unit the predetermined portions of the data is located detecting a failure of the first processor unit;

accessing the table from the memory element of the first processor unit to also access from the memory element the predetermined portions of the data according to the information contained in the table and transfer the predetermined portions of the data to the memory element of the second processor unit.

2. The method of claim 1, wherein the second processor unit detects the failure of the first processor unit.

3. The method of claim 2, wherein the accessing step includes the step of the second processor unit accessing the memory of the first processor unit.

4. The method of claim 2, and including the step of maintaining in the memory of the first processor unit a table containing information identifying where in the memory of the first processor the predetermined portions of the data are located, the accessing step including the second processor unit accessing the memory of the first processor unit to obtain the table and then accessing the memory of the first processor unit to retrieve the predetermined portions of the data according to the information.

5. The method of claim 1, wherein the detecting step includes the first processor unit detecting an error occurring in the operation of the first processor unit.

6. The method of claim 5, the accessing step including the steps of the first processor unit accessing its memory, and sending the predetermined portions of data to the second processor unit.

7. In a computing system having a plurality of processor units each having a memory element for storing data and each being communicatively interconnected to each of the other processor units for communicating data, a method of harvesting predetermined portions of the data stored in the memory element of a one of the processor units, the method including the steps of:

maintaining in the memory element of each of the processor units a table processor indicative of locations in such memory element of the predetermined portions detecting a failure of the one processor unit;

first, a second one of the plurality of processor units accessing the memory element of the one processor unit to retrieve the table;

then, the second one of the plurality of processing units accessing the memory element of the one processor unit to retrieve the predetermined portions of the data according to the locations contained in the table to transfer the predetermined portions of the data to the memory element of the second one of the plurality processor units.

8. The method of claim 7, wherein the accessing step includes accessing the memory element of the first processor unit by the second processor unit to retrieve the table, and the using step includes the second processor unit using the table.

9. The method of claim 7, wherein the accessing step includes the first processor unit accessing the corresponding memory element to retrieve the table to use the table to transfer the predetermined portions of the data to the memory element of the second processor unit.

* * * * *